(12) United States Patent
Kondo

(10) Patent No.: US 8,519,672 B2
(45) Date of Patent: Aug. 27, 2013

(54) DESULFATION DEVICE AND DESULFATION METHOD

(71) Applicant: T & K Co., Ltd., Nagoya (JP)

(72) Inventor: Toshihiko Kondo, Nagoya (JP)

(73) Assignee: T & K Co., Ltd., Nagoya (JP)

(*) Notice: Subject to any disclaimer, the term of this patent is extended or adjusted under 35 U.S.C. 154(b) by 0 days.

(21) Appl. No.: 13/753,367

(22) Filed: Jan. 29, 2013

(65) Prior Publication Data
US 2013/0141053 A1  Jun. 6, 2013

Related U.S. Application Data (63) Continuation of application No. PCT/JP2011/004406, filed on Aug. 3, 2011.

(30) Foreign Application Priority Data

Aug. 25, 2010 (JP) .................................. 2010-188043

(51) Int. Cl.
*H01M 10/44* (2006.01)
*H01M 10/46* (2006.01)

(52) U.S. Cl.
USPC ........................................................ 320/131

(58) Field of Classification Search
USPC ................... 320/107, 129, 131, 135, DIG. 16
See application file for complete search history.

(56) References Cited

U.S. PATENT DOCUMENTS

| | | | | |
|---|---|---|---|---|
| 4,269,810 A | * | 5/1981 | Kolakowski | 423/92 |
| 4,273,746 A | * | 6/1981 | Kolakowski | 423/92 |
| 2001/0019257 A1 | | 9/2001 | Bynum et al. | |
| 2004/0216448 A1 | * | 11/2004 | Brillant et al. | 60/274 |
| 2011/0163700 A1 | * | 7/2011 | Masten | 318/139 |

FOREIGN PATENT DOCUMENTS

| | | |
|---|---|---|
| JP | 10-509838 | 9/1998 |
| JP | 2010-176991 | 8/2010 |
| WO | 00/44062 | 7/2000 |
| WO | 2004/030137 | 4/2004 |
| WO | 2009/013804 | 1/2009 |
| WO | 2009/030101 | 3/2009 |

OTHER PUBLICATIONS

Search Report dated Oct. 25, 2011 from International Application No. PCT/JP2011/004406.

* cited by examiner

*Primary Examiner* — Edward Tso
(74) *Attorney, Agent, or Firm* — Beyer Law Group LLP (57) ABSTRACT

A desulfation device 10 drives its switching circuit 140 by using a pulse wave drive signal having a pulse width of 1.6 μsec and a frequency of 20000 Hz. The switching circuit 140 is switched on to allow extraction of electric current of 500 mA from a battery via a resistor R1, while being switched off to stop the extraction of electric current. When the switching circuit 140 is switched off, a back electromotive force and a reverse current of 500 mA are supplied to the battery. The supplied reverse current is negative current in the form of spikes. This electric current acts on electrodes of the battery and thereby enables removal of sulfation on the electrodes of the battery, while reducing a temperature increase of the desulfation device 10 during its operation.

10 Claims, 5 Drawing Sheets

|  | INITIAL VALUE | AFTER LAPSE OF 34 DAYS | AFTER LAPSE OF 87 DAYS |
|---|---|---|---|
| AVERAGE SPECIFIC GRAVITY | 1.255 | 1.266 | 1.280 |
| MAXIMUM SPECIFIC GRAVITY | 1.27 | 1.28 | 1.28 |
| MINIMUM SPECIFIC GRAVITY | 1.24 | 1.25 | 1.28 |
| SPECIFIC GRAVITY DIFFERENCE | 0.03 | 0.03 | 0 |
| TOTAL VOLTAGE | 50.4 | 54.4 | 52.4 |
| INCREASE RATE OF SPECIFIC GRAVITY |  | 1.0087 | 1.0199 |

Fig.8

|  | INITIAL VALUE | AFTER LAPSE OF 20 DAYS |
|---|---|---|
| AVERAGE SPECIFIC GRAVITY | 1.219 | 1.268 |
| MAXIMUM SPECIFIC GRAVITY | 1.24 | 1.28 |
| MINIMUM SPECIFIC GRAVITY | 1.20 | 1.26 |
| SPECIFIC GRAVITY DIFFERENCE | 0.04 | 0.02 |
| TOTAL VOLTAGE | 49.3 | 50.9 |
| TEMPERATURE | 13.7 | 38.2 |
| INCREASE RATE OF SPECIFIC GRAVITY |  | 1.040 |

Fig.9

| ELECTRIC CURRENT (mA) | AMBIENT TEMPERATURE (°C) | AMBIENT TEMPERATURE (°C) | TEMPERATURE INCREASE (°C) |
|---|---|---|---|
| 200 | 26 | 34 | 8 |
| 300 | 27 | 40 | 13 |
| 400 | 27 | 43 | 16 |
| 500 | 28 | 47 | 19 |

Fig.10

| | BATTERY VOLTAGE (V) | AMBIENT TEMPERATURE (°C) | CASING TEMPERATURE (°C) | CASING TEMPERATURE (°C) |
|---|---|---|---|---|
| COMPARISON 200mA | 36 | 25 | 31 | 6 |
| COMPARISON 200mA | 48 | 26 | 34 | 8 |
| EMBODIMENT 500mA | 36 | 27 | 32 | 5 |
| EMBODIMENT 500mA | 48 | 27 | 35 | 8 |

DESULFATION DEVICE AND DESULFATION METHOD

CROSS REFERENCE TO RELATED APPLICATIONS

This application is a Continuation of International Application No. PCT/JP2011/04406 filed Aug. 3, 2011, which claims benefit of priority to Japanese Application No. 2010-188043 filed Aug. 25, 2010, both of which are hereby incorporated by reference.

TECHNICAL FIELD

The present invention relates to technology of removing sulfation (desulfation) on electrodes of a lead-acid battery.

BACKGROUND ART

Sulfation on a positive electrode and a negative electrode of a lead-acid battery is known as one reason of degrading the performances of the lead-acid battery. The sulfation occurs on both the electrodes by the following electrochemical reactions of a diluted sulfuric acid electrolyte solution with the positive electrode (lead oxide electrode) and with the negative electrode (lead electrode) during operation (discharging) of the lead-acid battery. The electrochemical reactions proceed in the reverse direction during charging:

$$PbO_2 + 4H^+ + SO_4^{2-} + 2e^- \rightarrow PbSO_4 + 2H_2O \text{(positive electrode)}$$

$$Pb + SO_4^{2-} \rightarrow PbSO_4 + 2e^- \text{(negative electrode)}$$

Sulfation (lead sulfation) on the surfaces of the positive electrode and the negative electrode (electrode surfaces involved in charging) interferes with the desired electrochemical reactions between the respective electrodes and the electrolyte solution and thereby degrades the charging performance and the discharging performance of the lead-acid battery.

Application of a pulse current to the lead-acid battery is known as the technique of recovering the performances of the lead-acid battery, which are degraded by sulfation.

This known technique takes account of reduction of performance degradation of the lead-acid battery during discharging but does consider removal of sulfation on the electrodes of the used lead-acid battery or recovery of performances of the lead-acid battery. This known technique also does not take account of shortening a period of time required for removal of sulfation or reducing a temperature increase of a removal apparatus during removal of sulfation.

There is accordingly a requirement to shorten a period of time required for removal of sulfation, while reducing heat regeneration during removal of the sulfation in the lead-acid battery.

SUMMARY OF INVENTION

In order to achieve at least part of the above requirement, the invention provides various aspects described below.

According to a first aspect, there is provided a desulfation device applicable to a lead-acid battery. The desulfation device of the first aspect includes: an electrode connector connected with an electrode of the lead-acid battery; a drive signal generator configured to generate a pulse wave drive signal by using electric current extracted from the electrode of the lead-acid battery via the electrode connector; a resistor configured to regulate the electric current extracted from the electrode of the lead-acid battery via the electrode connector to electric current of not less than 300 mA; and a switcher connected with the drive signal generator and with the resistor and operated in response to the generated pulse wave drive signal to supply a back electromotive force and a reverse current to the lead-acid battery in synchronism with a falling edge of the pulse wave drive signal.

The desulfation device of the first aspect supplies a back electromotive force and a reverse current to the lead-acid battery in synchronism with a falling edge of the pulse wave drive signal, thus shortening the period of time required for removal of sulfation.

In the desulfation device of the first aspect, the drive signal generator may generate the pulse wave drive signal of a specific pulse width that causes a temperature increase of the desulfation device to be equal to or less tan a predetermined temperature value. This aspect shortens the period of time required for removal of sulfation, while reducing heat generation during removal of sulfation in the lead-acid battery.

In the desulfation device of the first aspect, the drive signal generator may generate the pulse wave drive signal of a pulse width that is equal to or less than a pulse width Pwmax calculated by an equation given below when Tbase represents a known temperature increase corresponding to a known pulse width Pwbase and Tmax represents an allowable temperature increase.

$$Pw_{max} = T_{max} \times \frac{Pw_{base}}{T_{base}}$$

This aspect causes the temperature increase of the desulfation device to be equal to or less than the allowable temperature increase.

In the desulfation device of the first aspect, the drive signal generator may generate the pulse wave drive signal having a smaller pulse width with an increase in output voltage of the lead-acid battery. This aspect effectively reduces heat generation during removal of sulfation in the lead-acid battery according to the output voltage of the lead-acid battery.

The desulfation device of the first aspect may further include a wave shaper configured to generate a sawtooth wave drive signal from the pulse wave drive signal generated by the drive signal generator. This aspect improves the efficiency of removal of sulfation.

In the desulfation device of the first aspect, the drive signal generator may generate the pulse wave drive signal having a frequency of 15000 Hz to 20000 Hz and a pulse width of 1 μsec to 2 μsec, and the resistor may regulate the electric current extracted from the electrode of the lead-acid battery to electric current of 300 to 500 mA. This aspect effectively shortens the period of time required for removal of sulfation, while reducing heat generation during removal of sulfation in the lead-acid battery.

According to a second aspect, there is provided a desulfation method for a lead-acid battery. The desulfation method of the second aspect includes the steps of: generating a pulse wave drive signal by using electric current extracted from an electrode of the lead-acid battery; regulating the electric current extracted from the electrode of the lead-acid battery to electric current of not less than 300 mA; and supplying a back electromotive force and a reverse current, which are attributed to the electric current of not less than 300 mA, to the lead-acid battery in synchronism with a falling edge of the pulse wave drive signal, wherein the respective steps are performed repeatedly The desulfation method of the second aspect has the similar functions and advantageous effects to those of the desulfation device of the first aspect and may be implemented by any of various aspects as in the desulfation device of the first aspect.

The desulfation method of the second aspect may be implemented in the form of a sulfation removing program or in the form of a computer readable medium in which the sulfation removing program is stored.

DESCRIPTION OF THE EMBODIMENTS

The following describes some embodiments of the desulfation device and the desulfation method according to the invention with reference to the accompanied drawings.

Figure 1:
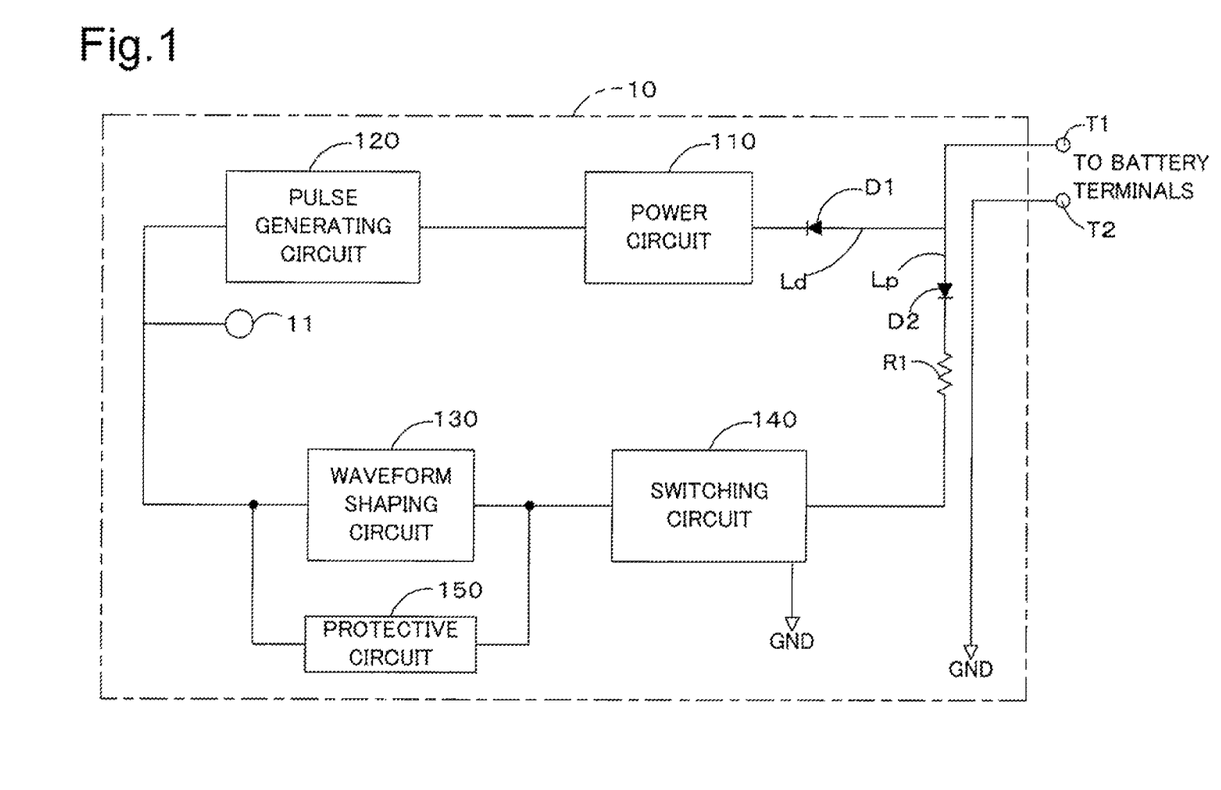
FIG. 1 is a block diagram illustrating the functional circuit structure of a desulfation device according to one embodiment.

FIG. 1 is a block diagram illustrating the functional circuit structure of a desulfation device (sulfation removal apparatus) according to one embodiment. The desulfation device 10 of the embodiment includes a power circuit 110, a pulse generating circuit 120, a waveform shaping circuit 130, a switching circuit 140, a protective circuit 150, an indication light 11, a positive terminal T1 and a negative terminal T2. The positive terminal T1 is connected with a positive electrode of a lead-acid battery (not shown). The positive terminal T1 is also connected with the power circuit 110 via a drive signal current line Ld arranged to supply the electric current extracted from the positive electrode of the lead-acid battery, to the power circuit 110, while being connected with the switching circuit 140 via a power current line Lp arranged to supply the electric current extracted from the positive electrode of the lead-acid battery, to the switching circuit 140. The drive signal current line Ld is provided with a diode D1 serving to prevent the reverse flow of electric current from the power circuit 110 to the positive terminal T1. The power current line Lp is provided with a diode D2 serving to prevent the reverse flow of electric current from the switching circuit 140 to the positive terminal T1 and with a resistor R1 serving to regulate the electric current that is to be supplied to the switching circuit 140, to a predetermined value. The indication light 11 is lit on during power supply (during operation) of the desulfation device 10. For example, a light-emitting diode may be used for the indication light 11. The respective circuits included in the desulfation device 10 of the embodiment may be provided in the form of an integrated circuit or may alternatively be provided in the form of discrete circuits.

The power circuit 110 is connected with the pulse generating circuit 120 via a signal line, and the pulse generating circuit 120 is connected with the waveform shaping circuit 130 via a signal line. The waveform shaping circuit 130 is connected with the switching circuit 140 via a signal line, and the switching circuit 140 is connected with the power current line Lp as described above. The protective circuit 150 is connected to the waveform shaping circuit 130. The negative terminal T2 is signal-grounded. Although signal-grounding of only the switching circuit 140 is explicitly illustrated in FIG. 1, the respective other circuits are similarly signal-grounded.

The power circuit 110 is provided in the form of a DC-DC converter serving to reduce the voltage level (12V to 48 V) supplied from the lead-acid battery to 10V that is the voltage for drive signal (control circuit voltage). The current for drive signal subjected to the voltage step-down by the power circuit 110 is supplied to the pulse generating circuit 120. The pulse generating circuit 120 is provided as a circuit serving to use the current for drive signal supplied from the power circuit 110 and thereby generate a pulse signal wave for driving the switching circuit 140. The pulse generating circuit 120 internally has an oscillator and outputs a pulse wave drive signal including a predetermined number of rectangular waves of a specified pulse width corresponding to a predetermined frequency. In other words, the pulse generating circuit 120 continually outputs a rectangular wave signal of a specified pulse width at a predetermined cycle (1/frequency).

The pulse generating circuit 120 of this embodiment generates a pulse wave drive signal of a specific pulse width that causes the temperature increase of the desulfation device 10 to be equal to or less than a predetermined temperature value. More specifically, the pulse generating circuit 120 generates a pulse wave drive signal of a pulse width that is equal to or less than a pulse width Pwmax calculated by an equation given below when Tbase represents a known temperature increase corresponding to a known pulse width Pwbase at the frequency of 15000 to 20000 Hz and Tmax represents an allowable temperature increase:

$$Pw_{max} = T_{max} \times \frac{Pw_{base}}{T_{base}}$$

The pulse width of the generated pulse wave drive signal is specifically 1 to 2 μsec and is more specifically about 1.4 to 1.7 μsec. For example, the maximum allowable pulse width is about 3.4 μsec when the known pulse width Pwbase is equal to 1.6, the known temperature increase Tbase is equal to 28° C. and the allowable temperature increase Tmax is equal to 60° C.

Figure 2:
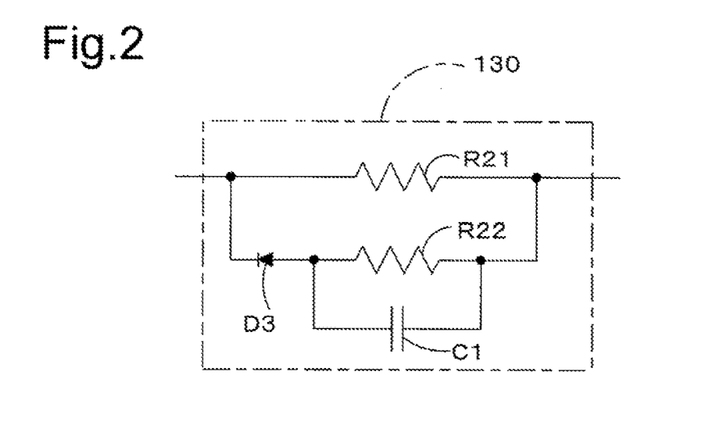
FIG. 2 illustrates an equivalent circuit to a waveform shaping circuit provided in the desulfation device according to the embodiment.
Figure 3:
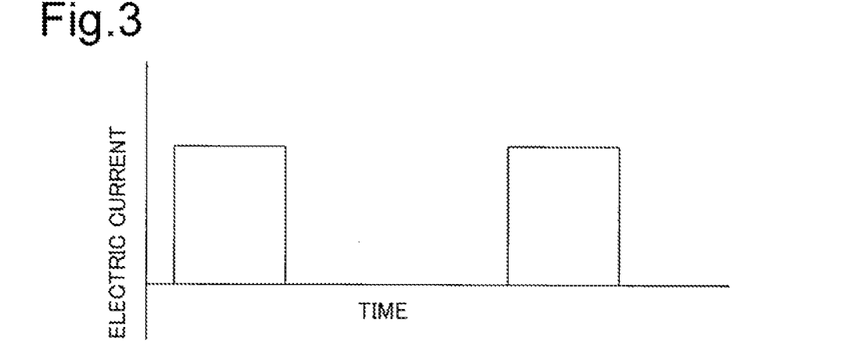
FIG. 3 illustrates one example of a pulse wave drive signal generated by a pulse generating circuit provided in the desulfation device according to the embodiment.
Figure 4:
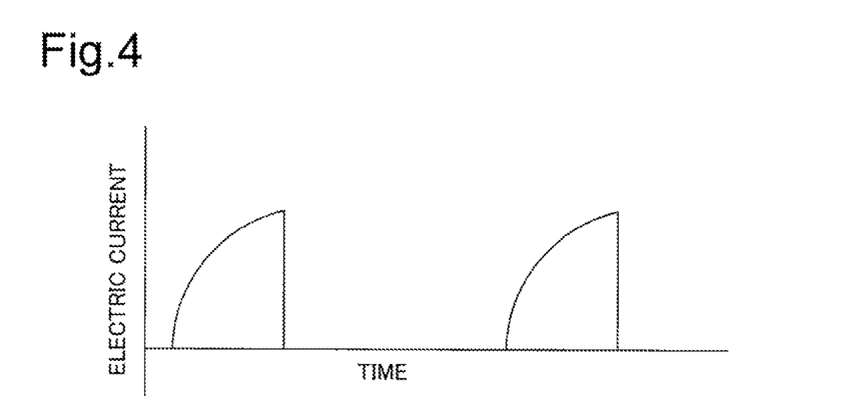
FIG. 4 illustrates one example of a sawtooth wave drive signal generated by the waveform shaping circuit provided in the desulfation device according to the embodiment.

The waveform shaping circuit 130 shapes the pulse wave drive signal generated by the pulse generating circuit 120 to a sawtooth waveform and outputs as a sawtooth wave drive signal. FIG. 2 illustrates an equivalent circuit to the waveform shaping circuit provided in the desulfation device according to the embodiment. FIG. 3 illustrates one example of the pulse wave drive signal generated by the pulse generating circuit provided in the desulfation device according to the embodiment. FIG. 4 illustrates one example of the sawtooth wave drive signal generated by the waveform shaping circuit provided in the desulfation device according to the embodiment.

The waveform shaping circuit 130 is a known circuit and includes, for example, two resistors R21 and R22 connected in parallel to each other, a capacitor C1 connected in parallel to the resistor R22 and a diode D3 connected in series with the resistor R22. The waveform shaping circuit 130 enables the pulse waveform shown in FIG. 3 to be shaped to the sawtooth waveform shown in FIG. 4, i.e., waveform having gentle rises and abrupt falls. Such wave shaping allows a quick switching action of a circuit that is actuated at a falling edge as the trigger, for example, the switching circuit 140.

The switching circuit 140 is provided as a circuit switched on and off in response to the shaped pulse wave drive signal. According to this embodiment, the switching circuit 140 is switched on to allow extraction of electric current from a battery via the power current line Lp, while being switched off to stop the extraction of electric current from the battery. The switching circuit 140 thus enables the pulse current to be flowed out of the battery. For example, a field-effect transistor (FET) or another switching element may be adopted for the switching circuit 140.

The protective circuit 150 is provided as a circuit serving to protect the resistor R1 from a potential failure, such as burning-out, when the pulse wave drive signal output from the waveform shaping circuit 130 is kept continuously at a high level (i.e., signal level that provides instruction for switch-on operation to the switching circuit 140). The protective circuit 150 may be implemented by a circuit using a Zener diode and a transistor as is known to one skilled in the art.

The resistor R1 is used to regulate the value of the power current that is to be supplied to the switching circuit 140. The resistance value is selected according to the voltage of a battery BT as the processing object, in order to regulate the power current to a current value of 300 to 500 mA. The following description is on the assumption of using the electric current of 500 mA.

Figure 5:
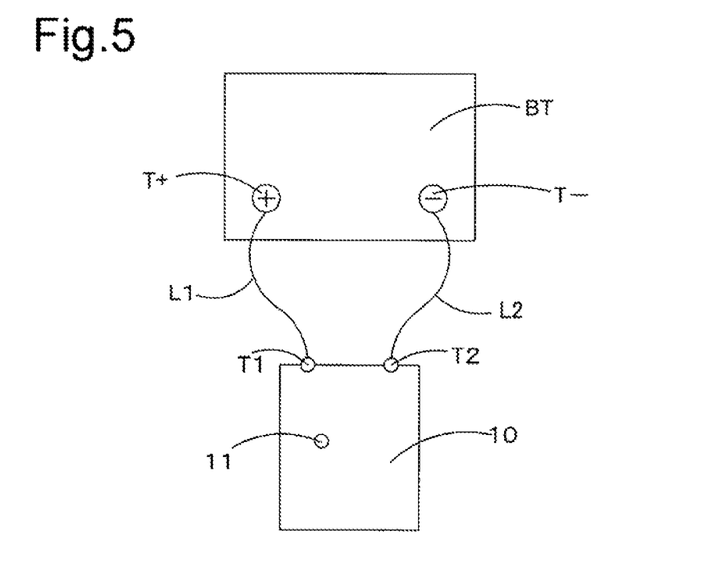
FIG. 5 illustrates one exemplary connection mode of the desulfation device of the embodiment with a lead-acid battery.
Figure 6:
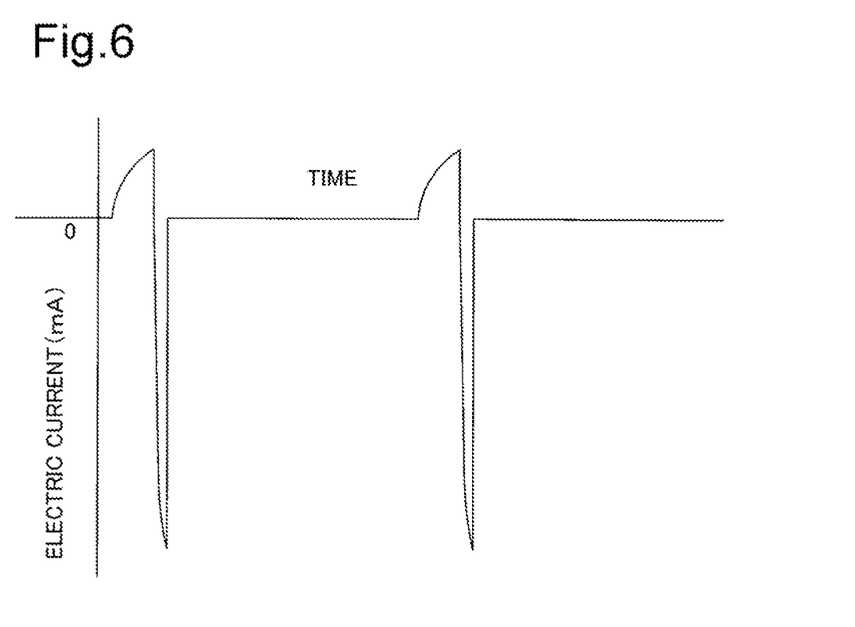
FIG. 6 schematically illustrates a variation in electric current between the desulfation device of the embodiment and the lead-acid battery.

The following describes the operations of the desulfation device 10 according to the embodiment. FIG. 5 illustrates one exemplary connection mode of the desulfation device of the embodiment with a lead-acid battery. FIG. 6 schematically illustrates a variation in electric current between the desulfation device of the embodiment and the lead-acid battery. The desulfation device 10 is used in connection with a battery BT. More specifically, a positive cable L1 connected with the positive terminal T1 of the desulfation device 10 is connected to a positive electrode T+ of the battery BT, whereas a negative cable L2 connected with the negative terminal T2 is connected to a negative electrode T− of the battery BT. The desulfation device 10 operates with the electric current supplied from the battery BT. In other words, the electric current extracted from the battery BT via the positive terminal T1 is supplied to the respective circuits via the drive signal current line Ld.

As described above, the desulfation device 10 is configured to extract the electric current in the form of pulses from the battery BT in response to the pulse wave drive signal. More specifically, the switching circuit 140 is switched on in response to the pulse wave drive signal to allow the electric current regulated to 500 mA by the resistor R1 to flow from the switching circuit 140 into the ground. The switching circuit 140 is switched off in response to the pulse wave drive signal to stop the flow of the electric current regulated to 500 mA into the ground. This series of operations enable the electric current in the form of pulses to be extracted from the battery BT. When the desulfation device 10 (switching circuit 140) stops the extraction of electric current at a falling edge of the pulse wave drive signal, there are a back electromotive force and a reverse current, which are attributed to inductance components including the positive cable L1, the negative cable L2 and the battery BT. The voltage and electric current in the form of spikes, which are negative with respect to the desulfation device 10, are then applied to the battery BT (on the assumption that the electric current extracted from the battery BT is positive). For example, electric current in the form of spikes as shown in FIG. 6 is applied to the battery BT. According to this embodiment, the pulse wave drive signal input into the switching circuit 140 is shaped to have the sawtooth waveform by the waveform shaping circuit 130. The switching circuit 140 thus relatively gently shifts to the ON state when being switched on, but instantaneously shifting to the OFF state when being switched off. As a result, the electric current and voltage in the form of spikes having the high peak (large height) and the small width are provided to the battery BT. The value of the reverse current in the form of spikes supplied to the battery BT is, for example, 2 to 3 A and increases with an increase in service current (power current). The current waveform shown in FIG. 6 is obtained by connecting a resistor to an electrode of the battery BT in series and measuring voltage waveforms at both ends of the resistor.

The electric current and voltage in the form of spikes acting on the positive electrode and the negative electrode of the battery enable sulfation or sulfate layers depositing on the positive electrode and the negative electrode (lead sulfate layers in the lead-acid battery) to be molecularly peeled off and separated from the respective electrodes and recovers the charging area involved in charging out of sulfate-covered surface area of each of the electrodes to its initial charging area. The molecular sulfate layer separated into an electrolyte solution is decomposed during charging of the lead-acid battery and is dissolved in the form of lead ion and sulfate ion into the electrolyte solution. Generation of $H_2O$, which proceeds during discharging of the lead-acid battery, stops during charging. As a result, the specific gravity of the electrolyte in the battery BT, i.e., lead-acid battery, is recovered to approach a favorable value of 1.280.

Results of Verification

The following describes results of various tests using the desulfation device 10 according to the embodiment and a desulfation device according to a comparative example.

Recovery of Battery Performances

Figure 7:
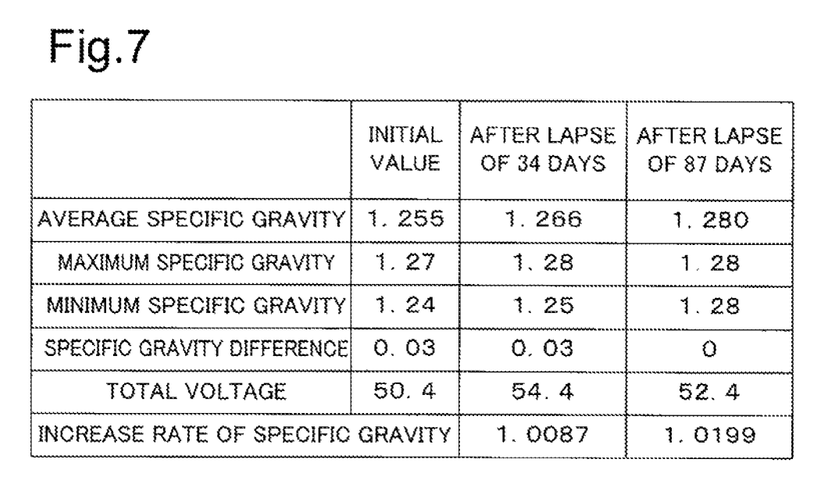
FIG. 7 illustrates the results of a test with respect to the performance recovery of the lead-acid battery by a desulfation device of a comparative example.
Figure 8:
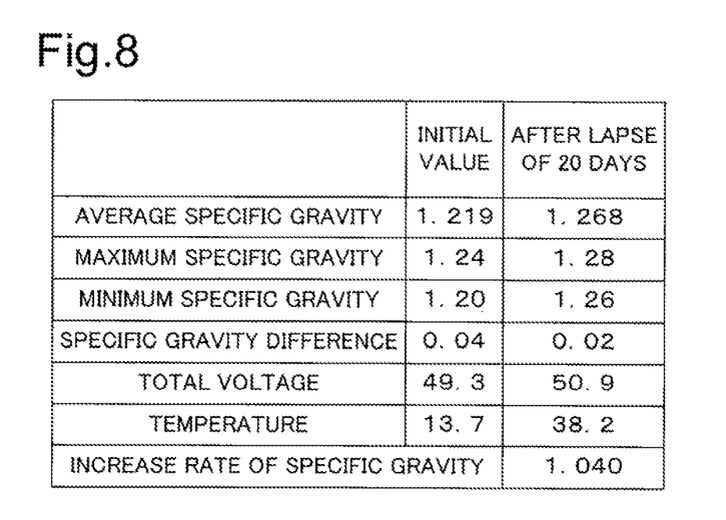
FIG. 8 illustrates the results of a test with respect to the performance recovery of the lead-acid battery by the desulfation device of the embodiment.

FIG. 7 illustrates the results of a test with respect to the performance recovery of the lead-acid battery by the desulfation device of the comparative example. FIG. 8 illustrates the results of a test with respect to the performance recovery of the lead-acid battery by the desulfation device of the embodiment. The following conditions were adopted for the test:

Comparative Example: pulse frequency: 20000 Hz, current value: 200 mA, battery: 48 volt battery manufactured by GS Yuasa Corporation Embodiment: pulse frequency: 20000 Hz, current value: 500 mA, battery: 48 volt battery manufactured by GS Yuasa Corporation The results of this test prove the recovery of the specific gravity by the desulfation device 10 of the embodiment and verify the mechanism of removing and dissolving the sulfate layers by using the electric current in the form of spikes as described above.

According to the comparative example shown in FIG. 7, the average specific gravity of the electrolyte solution was 1.255 as its initial value and was changed to 1.266 after a lapse of 34 days since the start of connection and was further changed to 1.280 after a lapse of 87 days since the start of connection. The favorable value of the specific gravity in the lead-acid battery is generally thought to be about 1.28, which was achieved after the lapse of 87 days. The improvement rate of the average specific gravity to the initial value, i.e., the increase rate of the specific gravity, was 1.0087 after the lapse of 34 days and was 1.0199 after the lapse of 87 days. The increase rate of the specific gravity accordingly remained at the value of 1.0199 after a lapse of approximately three months. According to the embodiment, on the other hand, the average specific gravity of the electrolyte solution was 1.219 as its initial value and was changed to 1.268 after a lapse of 20 days since the start of connection. The improvement rate of the average specific gravity to the initial value was 1.040 after the lapse of 20 days. The increase rate of the specific gravity accordingly achieved the value of 1.040 after a lapse of only about half a month.

The primary difference between the embodiment and the comparative example is the value of electric current. The desulfation device 10 of the embodiment using the larger current value can recover the performances of the battery within a time period of about ⅓-¼ of the recovery time by the desulfation device of the comparative example. When a long period of time, such as three to four months, is required to achieve the sufficient improvement of the battery performances, it is rather difficult for the user of the apparatus to effectively verify the improvement effect. The desulfation device 10 of the embodiment, on the other hand, allows verification of the improvement effect in a relatively shorter period of time, such as about half a month to one month and can thus meet the demand of the user of the apparatus.

These results of the test prove that the larger electric current applied to the battery BT provides the better improvement effect. The simple increase in value of electric current applied to the battery BT, however, causes a problem of increasing the operating temperature of the desulfation device (that may damage the circuit elements, such as resistor).

Temperature Change

Figure 9:
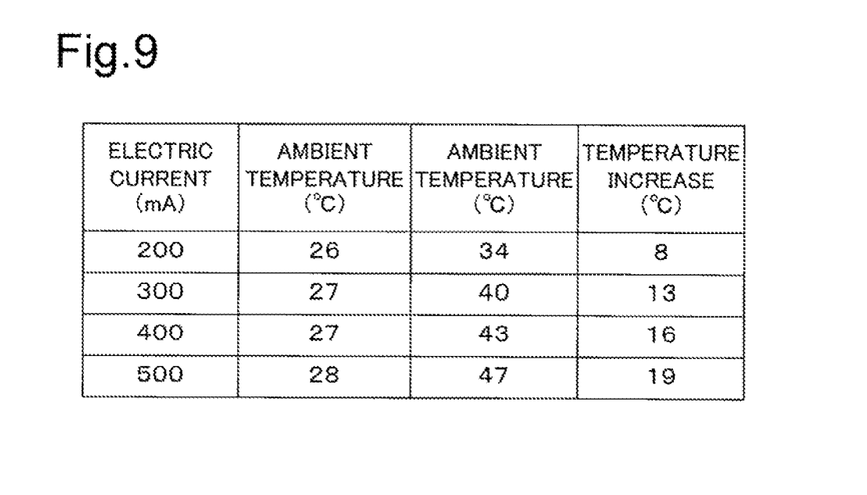
FIG. 9 illustrates a temperature change during operation of the desulfation device of the comparative example.
Figure 10:
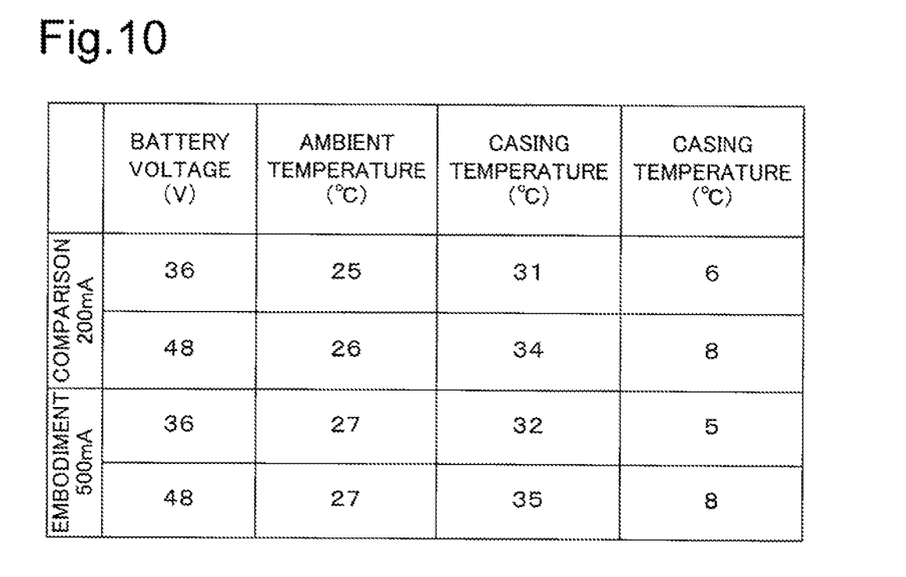
FIG. 10 illustrates a temperature change during operation of the desulfation device of to the embodiment.

FIG. 9 illustrates a temperature change during operation of the desulfation device of the comparative example. FIG. 10 illustrates a temperature change during operation of the desulfation device of the embodiment. For the purpose of verification, the temperature of the casing body of the desulfation device and the temperature of the resistor for regulating the electric current were measured with an infrared thermometer. FIG. 9 shows a temperature change of the comparative example obtained by increasing the electric current supplied to the switching circuit of the desulfation device from 200 mA to 500 mA under the conditions of the pulse frequency of 20000 Hz and the pulse width of 4 μsec of the pulse wave drive signal. The results of FIG. 9 show that the casing temperature increased with an increase in value of electric current and that the casing temperature reached 47° C. and the temperature increase reached 19° C. at 500 mA. The temperature of the resistor as the heat source reached 114° C. at 500 mA. In an application of the desulfation device in connection with a battery located in an engine room of an automobile, the operating environment temperature is about 60 to 70° C., so that the temperature of the resistor significantly exceeds 150° C. There is accordingly a high possibility that the resistor for general purpose is damaged.

The desulfation device 10 of the embodiment is, on the other hand, driven with the pulse wave drive signal having the pulse width of 1.6 μsec and the frequency of 20000 Hz, so as to eliminate this problem. FIG. 10 shows the results of verification with respect to the desulfation device 10 connected to a 36 volt battery and to a 48 volt battery and measured at 200 mA and 500 mA as the value of electric current supplied to the switching circuit 140.

According to the comparison using the electric current of 200 mA, the casing temperature was 31° C. and 34° C. and the temperature increase was 6° C. and 8° C. for the 36 volt battery and for the 48 volt battery, respectively. According to the embodiment using the electric current of 500 mA, on the other hand, the casing temperature was 32° C. and 35° C. and the temperature increase was 5° C. and 8° C. for the 36 volt battery and for the 48 volt battery, respectively. The temperature increase of this embodiment is accordingly reduced to 8° C., compared with the temperature increase of 19° C. in the comparative example of FIG. 9. This level of temperature increase is substantially equivalent to the temperature increase of the comparative example using the electric current of 200 mA.

The pulse width of 1.6 μsec is selected only for the purpose of reducing the temperature increase to a level equivalent to the conventional temperature increase. The smaller pulse width should be selected, in order to achieve a further reduction of the temperature increase. The larger pulse width may be selected, on the other hand, for a requirement that satisfies the less reduction of the temperature increase. At the operating current that is less than 500 mA, the resistor R1 has the less amount of heat generation, so that the larger pulse width is allowable. At the operating current that is not less than 500 mA, on the other hand, the resistor R1 has the greater amount of heat generation, so that the smaller pulse width is desirable. The amount of heat generation by the resistor R1 increases with an increase in voltage of the battery BT, so that the smaller pulse width may be used with an increase in voltage of the battery BT.

As described above, the desulfation device 10 of the embodiment increases the working current from the conventional level of 200 mA to 500 mA, so as to shorten the period of time required for recovery of the performances of the battery BT to ⅓-¼ of the conventionally required recovery time. In other words, the desulfation device 10 of the embodiment can remove the sulfate layers depositing on the electrodes of the battery BT more effectively than the conventional desulfation device.

Increasing the working current to 500 mA causes a potential problem of temperature increase of the desulfation device 10 (resistor R1). Reducing the pulse width of the pulse wave drive signal to 1.6 μsec that is about 1/2.5 of the conventional pulse width, however, advantageously reduces the temperature increase of the desulfation device 10 at the working current of 500 mA to the level equivalent to the temperature increase at the working current of 200 mA.

The desulfation device 10 of the embodiment can thus shorten the period of time required for removal of sulfation, while reducing heat generation during removal of sulfation.

Modifications (1) The foregoing description of the embodiment includes verification using the pulse wave drive signal having the frequency of 20000 Hz. The frequency of the signal may, however, be less than 20000 Hz or greater than 20000 Hz.

(2) The foregoing description of the embodiment includes verification using the electric current of 500 mA. The value of electric current used may, however, be in a range of 300 to 500 mA or may be greater than 500 mA.

(3) According to the above embodiment, the pulse wave drive signal generated by the pulse generating circuit 120 has a fixed pulse width. The pulse width may, however, be variable among a plurality of different values by switching operation. According to the above embodiment, the resistor R1 has a fixed resistance value. The resistor R1 may, however, be a variable resistor where the resistance value is variable among a plurality of different values by switching operations. In this modification, varying the resistance value according to the voltage of the battery BT enables one desulfation device 10 to be applicable to a plurality of different battery voltages. This also enables the value of electric current to be adequately changed according to the voltage of the battery BT and allows the user to determine and set desired parameters suitable for the operating environment, thus improving the convenience of the desulfation device 10.

The foregoing has described the invention with reference to the embodiment and some modifications. The embodiment of the invention described above is only for the purpose of facilitating the understanding of the invention and is not intended to limit the invention at all. The invention may be changed or modified without departing from the scope of the invention and includes such modifications and equivalents.

The invention claimed is:

1. A desulfation device applicable to a lead-acid battery, comprising:
    an electrode connector connected with an electrode of the lead-acid battery;
    a drive signal generator configured to generate a pulse wave drive signal with a specific pulse width that causes a temperature increase of the desulfation device to be equal to or less than a predetermined temperature value by using electric current extracted from the electrode of the lead-acid battery via the electrode connector;
    a resistor configured to regulate the electric current extracted from the electrode of the lead-acid battery via the electrode connector to electric current of not less than 300 mA; and
    a switcher connected with the drive signal generator and with the resistor and operated in response to the generated pulse wave drive signal to supply a back electromotive force and a reverse current to the lead-acid battery in synchronism with a falling edge of the pulse wave drive signal.

2. The desulfation device according to claim 1, wherein the drive signal generator generates the pulse wave drive signal of a pulse width that is equal to or less than a pulse width Pwmax calculated by an equation given below when Tbase represents a known temperature increase corresponding to a known pulse width Pwbase and Tmax represents an allowable temperature increase, $$Pw_{max} = T_{max} \times \frac{Pw_{base}}{T_{base}}.$$

3. The desulfation device according to claim 2, wherein the drive signal generator generates the pulse wave drive signal having a smaller pulse width with an increase in output voltage of the lead-acid battery.

4. The desulfation device according to claim 1, further comprising:
    a wave shaper configured to generate a sawtooth wave drive signal from the pulse wave drive signal generated by the drive signal generator.

5. The desulfation device according to claim 1, wherein
    the drive signal generator generates the pulse wave drive signal having a frequency of 15000 Hz to 20000 Hz and a pulse width of 1 μsec to 2 μsec, and
    the resistor regulates the electric current extracted from the electrode of the lead-acid battery to electric current of 300 to 500 mA.

6. A desulfation method for a lead-acid battery using a desulfation device, comprising the steps of:
    generating a pulse wave drive signal with a specific pulse width that causes a temperature increase of the desulfation device to be equal to or less than a predetermined temperature value by using electric current extracted from an electrode of the lead-acid battery;
    regulating the electric current extracted from the electrode of the lead-acid battery to electric current of not less than 300 mA; and
    supplying a back electromotive force and a reverse current, which are attributed to the electric current of not less than 300 mA, to the lead-acid battery in synchronism with a falling edge of the pulse wave drive signal, wherein
    the respective steps are performed repeatedly.

7. The desulfation method according to any one of claim 6, wherein
    the step of generating the pulse wave drive signal generates the pulse wave drive signal having a frequency of 15000 Hz to 20000 Hz and a pulse width of 1 μsec to 2 μsec, and
    the step of regulating the electric current extracted from the electrode of the lead-acid battery regulates the electric current extracted from the electrode of the lead-acid battery to electric current of 300 to 500 mA.

8. The desulfation method according to claim 6, wherein
    the step of generating the pulse wave drive signal generates the pulse wave drive signal of a pulse width that is equal to or less than a pulse width Pwmax calculated by an equation given below when Tbase represents a known temperature increase corresponding to a known pulse width Pwbase and Tmax represents an allowable temperature increase, $$Pw_{max} = T_{max} \times \frac{Pw_{base}}{T_{base}}.$$

9. The desulfation method according to claim 8, wherein
    the step of generating the pulse wave drive signal generates the pulse wave drive signal having a smaller pulse width with an increase in output voltage of the lead-acid battery.

10. The desulfation method according to claim 6, further comprising the step of:
    generating a sawtooth wave drive signal from the generated pulse wave drive signal.

* * * * *